(12) United States Patent
Fuse et al.

(10) Patent No.: US 6,541,156 B1
(45) Date of Patent: Apr. 1, 2003

(54) NEGATIVE ELECTRODE MATERIAL FOR NON-AQUEOUS LITHIUM SECONDARY BATTERY, METHOD FOR MANUFACTURING THE SAME, AND NON-AQUEOUS LITHIUM SECONDARY BATTERY USING THE SAME

(75) Inventors: Tooru Fuse, Inashiki-gun (JP); Hideharu Satou, Inashiki-gun (JP); Keiko Nishioka, Inashiki-gun (JP); Shinji Kasamatsu, Katano (JP); Yoshiaki Nitta, Hirakata (JP)

(73) Assignees: Mitsubishi Chemical Corporation, Tokyo (JP); Matsushita Electric Industrial, Osaka (JP)

( * ) Notice: Subject to any disclaimer, the term of this patent is extended or adjusted under 35 U.S.C. 154(b) by 29 days.

(21) Appl. No.: 09/712,207

(22) Filed: Nov. 15, 2000

(30) Foreign Application Priority Data

Nov. 16, 1999 (JP) ............................................ 11-325140
Nov. 16, 1999 (JP) ............................................ 11-325141

(51) Int. Cl.$^7$ ......................... H01M 4/58; H01M 6/00; H01M 4/62
(52) U.S. Cl. ............................... 429/218.1; 429/231.8; 429/231.4; 429/232; 29/623.5; 252/182.1
(58) Field of Search ......................... 429/218.1, 231.8, 429/231.4, 232; 29/623.1, 623.3, 623.4, 625.5; 252/182.1

(56) References Cited

U.S. PATENT DOCUMENTS

| 4,101,624 A | * | 7/1978 | Johnson et al. ............. 264/273 |
| 5,888,430 A | | 3/1999 | H. Wakayama, et al. |
| 6,090,505 A | * | 7/2000 | Shimamura et al. ..... 429/218.1 |
| 6,139,991 A | * | 10/2000 | Hamamoto et al. ......... 429/307 |

FOREIGN PATENT DOCUMENTS

| JP | 57-208079 | 12/1882 |
| JP | 5-286763 | 11/1993 |
| JP | 7-240201 | 9/1995 |
| JP | 8-153517 | 6/1996 |
| JP | 9-249407 | 9/1997 |
| JP | 10-199527 | 7/1998 |

* cited by examiner

*Primary Examiner*—Stephen Kalafut
*Assistant Examiner*—Raymond Alejandro
(74) *Attorney, Agent, or Firm*—Jordan and Hamburg LLP

(57) ABSTRACT

The present invention relates to a negative electrode material for a non-aqueous lithium secondary battery comprising a metal material M consisting of solid phases A and B, a graphite material, and a carbonaceous material having a crystallinity lower than that of said graphite material, wherein said metal material M has a structure in which a part or all of the surface of a core particle consisting of said solid phase A is covered with said solid phase B; said solid phase A contains at least silicon as a constitutive element; and said solid phase B is a solid solution or an intermetallic compound of silicon and a specific element.

20 Claims, No Drawings

NEGATIVE ELECTRODE MATERIAL FOR NON-AQUEOUS LITHIUM SECONDARY BATTERY, METHOD FOR MANUFACTURING THE SAME, AND NON-AQUEOUS LITHIUM SECONDARY BATTERY USING THE SAME

BACKGROUND OF THE INVENTION

The present invention relates to a negative electrode material for a non-aqueous lithium secondary battery suitable for a power supply of a small lightweight electrical equipment or an electric automobile, a method for manufacturing the negative electrode material, and a non-aqueous lithium secondary battery using the negative electrode material.

In recent years, a secondary battery with a high capacity is demanded as the minimization of an electrical equipment proceeds. Accordingly, a non-aqueous lithium battery with a high energy density attracts more attention than a nickel-cadmium battery or a nickel-hydrogen battery.

As a negative electrode material, the use of lithium metal has first been attempted. However, it has been found that arborescent lithium precipitates by the repetition of charge/discharge and reaches a positive electrode through a separator, thereby bringing about short circuit.

Furthermore, Japanese Provisional Patent Publication No.208079/1982 has proposed the use of lithium as a negative electrode material and graphite having a high degree of crystallinity as an electrode plate. In the case that graphite is used, however, intercalation into graphite crystals is utilized for lithium occlusion, so that there is a drawback that the battery in excess of 820 mAh/cc which is a theoretical volumetric capacity cannot be obtained at ordinary temperature and under atmospheric pressure.

It is known that a metal such as Al, Si or Sn which can be combined with lithium can suitably be used as the negative electrode material capable of realizing the higher capacity, but there is a disadvantage that the capacity of such a material noticeably deteriorates with the repetition of a charge and discharge cycle.

Japanese Provisional Patent Publication No.286763/1993 discloses that adding a plurality of kinds of carbonaceous materials in Al can suppress the reduction in the capacity with the charge and discharge cycle, but the use of Al limits the capacity per volume up to 2,839 mAh/cc. On the other hand, the capacity per volume in case of using Si is large since its maximum value is 4,684 mAh/cc, but a change in volume during charge and discharge is also large and the occurrence of the above-described problem avoids a practical application as the negative electrode material.

As a method for solving these problems, a technique using silicide powder as a negative electrode material for a lithium secondary battery is recently disclosed in Japanese Provisional Patent Publication No.240201/1995. It has been found that such a chemical compound has a relatively large volumetric capacity and a long cycle life. However, this material has a low electric conductivity. When this material is used as a simple substance, it cannot be sufficiently combined with Li and hence cannot exhibit the theoretical capacity. As a method for solving the problem, Japanese Provisional Patent Publication No.153517/1996 discloses a technique by which a conductive agent such as acetylene black is added to the powder of this material to form the negative electrode material.

However, the particle diameter of acetylene black is generally as very small as less than 1 μm, and hence, its specific surface area is large, which disadvantageously increases the irreversible capacity in initial charge.

In order to solve such problems, Japanese Provisional Patent Publication No.199527/1998 discloses the use of graphite particles having the high crystallinity together with silicide as a conductive material. As a result, both the capacity and the cycle life are improved and the irreversible capacity in the initial charge is reduced as compared with the case where the silicide is used as a simple substance. However, when the charge and discharge cycle is effected for a long period of time, the capacity is gradually reduced. It can be considered that this reduction occurs for the reason that a change in volume of silicide involved by the charge and discharge of lithium has an influence on the structure of the negative electrode given an electrical conductivity with graphite and destroys this structure with the charge and discharge cycle.

In order to suppress the above-described destruction of the structure, Japanese Provisional Patent Publication No.249407/1997 proposes a method by which both the negative electrode material powder and graphite are mechanically treated to obtain such a structure that a graphite material as a conductive agent approximates to the main negative electrode material which is not silicide but Si metal. It can be inferred that the application of this technique to silicide can extend the cycle life as similar to the case of Si. On the other hand, if the graphite particles are subjected to the mechanical treatment, the specific surface area of graphite can be increased, which may be disadvantageously led to increase. in the irreversible capacity in the initial charge.

As a result of intense examination, the present inventors have found that the use of a later-described material having a specific constitution as a negative electrode material for a lithium secondary battery or the use of a negative electrode material for a lithium secondary battery produced by a later-described method can create a negative electrode which has a high capacity, is hardly degraded in the capacity even if a long charge and discharge cycle is effected and suppresses an irreversible capacity generated in the initial charge and discharge.

That is, an object of the present invention is to provide a negative electrode material which has a high capacity, a long cycle life and a small irreversible capacity in the initial charge, namely which is electrolyte friendly, a manufacturing method thereof, and a lithium secondary battery using the negative electrode material.

SUMMARY OF THE INVENTION

To achieve this aim, a lithium secondary battery is a non-aqueous lithium secondary battery comprising at least a positive electrode, a negative electrode and an electrolytic solution in which an electrolyte is dissolved in a non-aqueous solvent; the negative electrode material contains a metal material M consisting of solid phases A and B, a graphite material and a carbonaceous material having a crystallinity lower than that of the graphite material; the metal material M has such a structure that a part or all of the surface of a core particle consisting of the solid phase A is covered with the solid phase B; the solid phase A includes at least silicon as a constitutive element; the solid phase B is a solid solution or an intermetallic compound of silicon and at least one element selected from the group consisting of elements in the group 2, transition metal elements, elements in the group 12, elements in the group 13 and elements excepting carbon and silicon in the group 14 of the periodic table. Furthermore, a method for manufacturing the negative electrode material is characterized in that the metal material M, the graphite material and a precursor of a carbonaceous material which is an organic material are mixed and baked in the inactive atmosphere; the metal material M consists of solid phases A and B and has such a structure that a part or all of the surface of a core particle consisting of the solid phase A is covered with the solid phase B; the solid phase A includes at least silicon as a constitutive element; the solid phase B is a solid solution or an intermetallic compound of silicon and at least one element selected from the group consisting of elements in the group 2, reduced metal elements, elements in the group 12, elements in the group 13 and elements excepting carbon and silicon in the group 14 of the periodic table.

Here, although the detail will be described later, the precursor of the carbonaceous material means a material which can be a carbonaceous material having the crystallinity lower than that of the graphite material after baking.

When the metal material M having a large volumetric capacity and graphite which is a conductive particle are integrally subjected to the contact treatment by using a carbonaceous material, the high capacity and the long cycle life can be both attained, and the existence of the carbonaceous material on the surface can suppress the irreversible capacity generated in the initial charge.

Although the metal material M comprises a solid solution or an intermetallic compound, this can be obtained by fusing a substance in which constitutive elements are mixed with a predetermined ratio at a high temperature and quenching and solidifying the molten substance by the dry spraying method, the roll quenching method, the rotating electrode method and so forth. At this time, a preferred structure of the solid solution or the intermetallic compound can be obtained when the molten substance is subjected to heat treatment at a temperature lower than a solidus temperature at a constitutive element ratio of the particle in a metallic phase diagram. This method precipitates the solid phase B on all or a part of the surface of the core consisting of the solid phase A to be covered by controlling quenching and solidification of the molten substance, thereby obtaining the metal material M. However, the following heat treatment can increase the uniformity of the solid phases A and B, and such a substance may be used as the metal material M. Further, the method of quenching and solidification is not restricted to the above.

In addition, the metal material M may be obtained by accreting a layer consisting of elements excepting constitutive elements of the solid phase A from those of the solid phase B on the surface of the powder consisting of the solid phase A and performing heat treatment at a temperature lower than a solidus temperature of the metal material M in the metallic phase diagram. By this heat treatment, the elements in the solid phase A diffuses in the accreted layer and the diffused layer becomes a composition of the solid phase B. The above accretion can be carried out by the plating method or the mechanical alloying method. The mechanical alloying method is one of the methods which can obtain the metal material M without performing heat treatment.

When the above-described metal material M and the graphite particle being superior in the electric conductivity are mixed with a carbonaceous material and applied, it is possible to produce a material which has the high capacity and a long cycle life and which suppresses an irreversible capacity generated in the initial charge.

DESCRIPTION OF THE PREFERRED EMBODIMENTS

The present invention will now be described in detail.

As a compounding conformation of a metal material M, graphite, and a carbonaceous material having a crystallinity lower than that of a graphite material which comprises a negative electrode material according to the present invention, there are exemplified (1) a conformation in which the metal material M powder, the graphite material powder, and the carbonaceous material powder are mixed; (2) a conformation in which the metal material M powder and the graphite material powder having the surface partially or entirely covered with the carbonaceous material are mixed; (3) a conformation in which the metal material M powder having the surface partially or entirely covered with the carbonaceous material and the graphite material powder or that whose surface is partially or entirely covered with the carbonaceous material are mixed; (4) a conformation in which a part or all of the surface of the metal material M powder is combined with or covered with the graphite material powder and the carbonaceous material, and (5) a conformation in which the metal material M powder having the surface partially or entirely covered with the graphite material powder is combined with or covered with the carbonaceous material; or a conformation in which one or more of the above conformations are mixed.

Since the above-described conformation (3), (4) or (5) of the negative electrode material enables the carbonaceous material having the crystallinity lower than that of the graphite and/or the graphite material to directly cover the surface of the metal material M, it is preferable in terms of reduction in the reactivity of the electrolytic solution and the metal material M and improvement in safety. The conformations (4) and (5) are more preferable in light of the fact that the graphite material exists in the vicinity of the metal material M and the electrical conductivity can be readily maintained.

As an average particle diameter of the negative electrode material, 8 to 25 $\mu$m is desirable when a laser diffraction type particle size distribution measuring device is used. If the average particle diameter is not more than this particle diameter, the specific surface area increases, in case of the negative electrode material for the lithium secondary battery, thereby, the irreversible capacity in the initial charge and discharge increases. On the other hand, if the average particle diameter is not less than this particle diameter, a negative electrode such as described later is hard to be produced.

The tap density of the negative electrode material can be measured by using a powder density measuring device (Tap denser KYT-3000 manufactured by Seishin Enterprise Co., Ltd.). When this measuring device is used to perform tapping with a stroke length of 10 mm for 100 times, the negative electrode material having the tap density which is not less than 1.3 g/cm$^3$ is preferable as the negative electrode material for the lithium secondary battery, since it can manifest the higher capacity per volume (cm$^3$) as compared with the graphite-based negative electrode material or the amorphous carbon-based negative electrode material. The negative electrode material having the tap density of not less than 1.5 g/cm$^3$ or 1.7 g/cm$^3$ is more preferable since good filling properties can be obtained and the capacity can be increased.

Further, in the compounding conformations of (3), (4) and (5), at least one covering layer consisting of the graphite material and/or the carbonaceous material may exist on the uppermost surface of the metal material M. In such a case, the thickness can be obtained from a difference between the mode diameter of the particle of the material according to the present invention obtained when measured by the laser diffraction type particle size distribution measuring device and the mode diameter of the simple substance of the metal material M particle similarly measured. If the particle of the material according to the present invention is used as the negative electrode material, it is preferable that the size of this particle is in a range of 0.05 to 5 μm. It is more preferable that it is in a range of 0.1 to 4 μm.

In regard to the percentages of the metal material M, the graphite material and the carbonaceous material in the negative electrode material, it is desirable that each content can be arbitrarily changed. Assuming that the entire powders are 100 wt %, if they are within ranges of 50 to 95 wt %, 4.9 to 30 wt % and 0.1 to 20 wt %, respectively, the capacity and the cycle life can be increased and the irreversible capacity in the initial charge and discharge can be reduced advantageously. It is more preferable that they fall within ranges of 80 to 95 wt %, 4.9 to 20 wt % and 0.1 to 10 wt %, respectively, and it is most preferable that they fall within ranges of 82 to 95 wt %, 4.9 to 17 wt % and 0.1 to 10 wt %, respectively.

Additionally, on the basis of Raman spectrum analysis using an argon ion laser beam having a wavelength of 514.3 nm for the negative electrode material, it is preferable that the peak intensity ratio R (=IB/IA) falls within a range of not less than 0.2 and not more than 1 and it is more preferable that the peak intensity ratio R falls within a range of not less than 0.25 and not more than 0.7, wherein IA is a peak intensity which appears in a range of 1580 $cm^{-1}$ to 1620 $cm^{-1}$, and IB is a peak intensity which appears in a range of 1350 $cm^{-1}$ to 1370 $cm^{-1}$.

If the BET specific surface area measured by using nitrogen gas is 0.1 to 20 $m^2/g$, the irreversible capacity in the initial charge and discharge is preferably reduced in case of the negative electrode. The range of 0.1 to 15 $m^2/g$ is more preferable and the range of 0.1 to 6 $m^2/g$ is most preferable.

The electrical conductivity of the negative electrode material was measured as follows. A pressure type powder resistance measuring unit option (manufactured by Mitsubishi Chemical) was connected to a four-terminal electrode type conductivity measuring device (Loresta-GP MCP-T600 manufactured by Mitsubishi Chemical). After putting the active material powder into a measuring cell, the pressure applied on the powder was adjusted in such a manner that its void ratio becomes 75%. If the electric conductivity measured at this time is not less than $1 \times 10^{-5}$ S/cm, charge and discharge of lithium can be preferably performed in case of forming the negative electrode material. It is more preferable when this value is not less than $1 \times 10^{-4}$ S/cm, and it is most preferable when this value is not less than $1 \times 10^{-3}$ S/cm. The upper limit of the electric conductivity is usually not more than $1 \times 10^{4}$ S/cm.

Further, as described above, the conformation having the structure in which a layer consisting of the graphite material and/or the carbonaceous material is bonded with or covers the circumference of the metal material M particle is preferable. Moreover, among materials having such a structure, a material having a following structure is preferable. That is, the powder of the material according to the present invention is embedded and cured in epoxy resin to be thereafter cut by a microtome. Further, when the appeared cut surface is observed by an SEM, a covering layer which consists of the graphite material and/or the carbonaceous material and has a thickness can be observed on the circumference of the uppermost surface of the metal material M, and at least a plurality of particles which take 30 to 100% of the circumferential length of the uppermost surface of the metal material M can be observed along the length of the covering layer. That is, when the metal material M is considered as a sphere which can be converted from the mode diameter of the metal material M, it is preferable that a layer consisting of the graphite material and/or the carbonaceous material covers 30 to 100% of the surface of the sphere on average. The layer covering 90% to 100% of the surface is more preferable, and the layer covering 100% of the same is most preferable.

As a method for manufacturing the structure in which a layer consisting of the graphite material and/or the carbonaceous material is combined with or covers the circumference of the above-described metal material M particles, there are exemplified (1) a conformation in which the metal material M particles, the graphite material particle, and the carbonaceous material particles obtained by baking the precursor of the carbonaceous material are respectively mixed; (2) a conformation in which a part or all of the surface of the metal material M powder is subjected to the contact treatment by using the precursor of the carbonaceous material and baked, and the appropriate cracking or powdering treatment is carried out to obtain powder, and then the obtained substance is mixed with the graphite material powder; (3) a conformation in which a part or all of the surface of the metal material M is subjected to the contact treatment by using the precursor of the carbonaceous material and baked, and the above-described treatment is carried out to obtain powder, and then the obtained substance is mixed with powder obtained by subjecting a part or all of the surface of the graphite material powder to the contact treatment by using the precursor of the carbonaceous material, baking, followed by powdering, (4) a conformation in which a mixture of the graphite material and the carbonaceous precursor is subjected to the contact treatment with respect to a part or all of the surface of the metal material M and backed, and then the above-mentioned treatment is carried out to obtain particulate; (5) a conformation in which the graphite material previously covers a part or all of the surface of the metal material M, the precursor of the carbonaceous material is subjected to the contact treatment with respect to the obtained product to produce a material consisting of a composite layer having at least two layers, baking is performed, and then the above-described treatment is carried out to obtain particulate; and a conformation in which at least one of these conformations is mixed.

The contact treatment of the precursor of the carbonaceous material described herein includes a concept from combination of particulate of the above substances to formation of a layer consisting of the above-mentioned substance on the surface of particulate, i.e., covering.

Any order of mixing the three types of the materials for constituting the negative electrode material is possible as long as the invention claimed in claims are not read so as to unreasonably restrict. However, if the metal material M and the graphite material are first mixed and the precursor of the carbonaceous material is further added thereto and mixed, the graphite material which is a conductive agent approximates the surface of the metal material M. It is preferable since the electric conductivity can be maintained even during progress of the charge and discharge cycle.

As compounding means of the respective materials for producing the above active substance, the conventionally known method may be applied. For example, it is possible to combine at least one of a powder mixer such as a V blender, a mixer such as an axial mixer, a disperser, a paddle mixer, a Redige mixer, a planetary mixer and an emulsion disperser, a kneading machine such as a KRC kneader, a kneader and a grinder, a crusher or a cracking machine such as a turbo mill, a ball mill, a jet mill, a disk mill, an impact mill, a pin mill and a hammer mill, granulation, surface reforming or coating devices such as a mechano fusion, a hybridizer, a theta composer and so forth.

In the compounding conformation (4) in particular, since use of a grinder or a kneader can homogeneously mix the raw materials, it can be preferably used. In the compounding conformation (5), since use of a mechano fusion or a hybridizer described above can appropriately set the operational conditions so that the surface of the metal material M can be efficiently covered with the graphite material, which is preferable. Although the mechanical treatment with the mechano fusion or the hybridizer is also possible in the atmosphere, mainly the surface of the graphite particles which is the conductive material is damaged by oxidation, and the electric conductivity may be lowered. It is, therefore, preferable to perform this treatment in the inactive atmosphere such as nitrogen or argon. Although the strength of the treatment differs depending on each device, it is preferable to perform the treatment at the shear rate of not less than 10 $s^{-1}$. If the shear rate becomes slower, since the metal material M is different from the graphite material in gravity, the both materials are not sufficiently mixed, which may lead to uneven mixing. Moreover, the above treatment is preferably carried out at the shear rate of not less than In order to produce the negative electrode material according to the present invention, after mixing the raw materials by using the above-described means, baking must be further effected. It is preferable that a baking temperature falls within a range of 700 to 1500° C. Since the aromaticity of the carbonaceous material does not sufficiently develop at a temperature not more than the above value, the electric conductivity is lowered and the irreversible capacity is likely to be generated in the lithium charge and discharge. At a temperature not less than the above value, since such a temperature is close to a fusing point of the metal material as the raw material, the metal portion fuses and an active substance is hardly obtained. It is preferable that this temperature falls within a range of 800 to 1300° C. and it is most preferable that the same falls within a range of 800 to 1100° C.

Raw materials required for manufacturing the negative electrode material will now be described.

It is preferable that the metal material M consists of solid phases A and B; a part or all of the surface of the core particle consisting of the solid phase A is covered with the solid phase B; the solid phase A includes at least silicon as a constitutive element; the solid phase B is a solid solution or an intermetallic compound of silicon and at least one element selected from the group consisting of elements in the group 2, transition elements, elements in the groups 12 and 13, and elements excepting carbon and silicon in the group 14 of the periodic table. For example, the solid phase A consists of Si, and the solid phase B consists of a metal material consisting of $NiSi_2$, $CoSi_2$, $VSi_2$, $TiSi_2$, $MnSi_{1.8}$ and/or $Mg_2Si$.

As the graphite material, it is preferable to use highly crystalline graphite powder which have the spacing $d_{002}$ of the crystalline planes (002) of not more than 0.348 nm and the lamination layer thickness Lc of the graphite material of not less than 10 nm. The graphite material having $d_{002}$ of not more than 0.338 nm and Lc of not less than 20 nm is more preferable and the graphite material having $d_{002}$ of not more than 0.337 nm and the Lc of not less than 40 nm is most preferable.

When the graphite material is subjected to Raman spectrum analysis using an argon ion laser beam having a wavelength of 514.3 nm, the graphite material preferably has a peak intensity ratio R (=IB/IA) of not more than 0.4, wherein IA is a peak intensity that appears in the range of 1580 $cm^{-1}$ to 1620 $cm^{-1}$, and IB is a peak intensity that appears in the range of 1350 $cm^{-1}$ to 1370 $cm^{-1}$. The graphite material having R of not more than 0.3 is more preferable and the graphite material having R of not more than 0.25 is most preferable.

It is preferable that the average particle diameter of the graphite material to be used is not less than 1 $\mu$m and not more than 1 mm. If the average particle diameter becomes larger, the graphite material is hard to be homogeneously mixed with the metal material M. Further, if the average particle diameter becomes smaller, the specific surface area is too large and the irreversible capacity in the initial charge and discharge becomes large. The average particle diameter of 1 to 40 $\mu$m is more preferable, and that of 1 to 25 $\mu$m is most preferable. Even though the average particle diameter deviates from the above range, the graphite material can be used if the average particle diameter can fall within the above range at the step for performing the mechanical treatment described above.

As such a graphite material, it is possible to use appropriate natural graphite, artificial graphite, a high purity refined product obtained from these types of graphite, a reheated product obtained from these types of graphite, or powder of a mixture consisting of these products such that the spacing $d_{002}$ of the crystalline planes (002) is not more than 0.348 nm.

As the precursor of the carbonaceous material, there is used at least one carbonizable organic compound selected from the group consisting of coal tar pitch from soft pitch to hard pitch; coal-based heavy oil such as carbonization liquefied oil; heavy oil from direct distillation such as a reduced crude or vacuum distillation residue; petroleum based heavy oil which is cracking-based heavy oil such as ethylene tar which is a byproduct from thermal cracking of crude oil or naphtha etc.; aromatic hydrocarbon such as acenaphthylene, decacyclene, anthracene or phenanthrene etc.; azacyclic compound such as phenazine or acridine etc.; thiacyclic compound such as thiophene or bithiophene etc.; polyphenylene such as biphenyl or terphenyl etc.; poly(vinyl chloride); poly(vinyl alcohol); poly(vinyl butyral); an insolubilized material obtained from the above substances; nitrogen-contained compound such as polyacrylonitrile; an organic polymer such as polypyrrol; sulfur-contained compound such as polythiophene, an organic polymer such as polystyrene; a natural polymer such as polysaccharide etc. as typified by cellulose, lignin, mannan, polygalacturonic acid, chitin, chitosan or saccharose; thermoplastic resin such as polyphenylene sulfide or polyphenylene oxide etc.; thermosetting resin such as furfuryl alcohol resin, phenol-formaldehyde resin or imide resin; and mixtures of the above substances and low molecular organic solvent such as benzene, toluene, xylene, quinoline or n-hexane etc.

When the precursor of the carbonaceous material having H/C of not less than 0.4 and not more than 1.8 is used, it can be readily mixed with the metal material or the graphite material, which is preferable. H/C of not less than 0.6 and not more than 1.2 is more preferable, and that of not less than 0.8 and not more than 1.1 is most preferable. If H/C exceeds the above range, the carbonization yield after baking is deteriorated, and the materials are hardly mixed with each other.

In regard to the ratio of the metal material M, the graphite material and the carbonaceous material produced by baking the precursor of the carbonaceous material in the negative electrode material, assuming that the whole is 100 wt %, these substances are 50 to 95 wt %, 4.9 to 30 wt %, and 0.1 to 20 wt %, respectively. Then, the negative electrode material which has a large capacity per volume, the excellent cycle life and the small irreversible capacity in the initial charge and discharge can be preferably produced. However, since the above numerical range corresponds to the weight percentage after baking, a change in weight occurred due to baking must be taken into consideration in the material mixing stage.

Although the conventionally known types of the metal material M, the graphite material and the carbonaceous material can be used as long as they fall within claims, for example, the metal material M consisting of the solid phase A consisting of Si and the solid phase B consisting of $NiSi_2$, $CoSi_2$, $VSi_2$, $TiSi_2$, $MnSi_{1.8}$ and/or $Mg_2Si$ is preferable. Further, as the graphite material, for example, highly crystalline artificial graphite or natural graphite having the spacing $d_{002}$ of the crystalline planes (002) of not more than 0.338 nm, high purity refined products or mixtures of these substances are preferable.

Description will now be given as to the method for making a negative electrode by using the negative electrode material according to the present invention.

In regard to the negative electrode according to the present invention, conventionally known methods can be adopted without limit as long as the metal material M, the graphite material and the carbonaceous material having the crystallinity lower than that of the graphite material are used. For example, a material having the weight ratio relative to the metal material M/the graphite material/the carbonaceous material being 90/9/1 is mixed and heated in order to produce the negative electrode body. Specifically, the metal material M and the graphite material are first mixed by using a grinder until they become homogeneous, and the precursor of the carbonaceous material is added thereto and then kneaded by using a mixer and the like. The obtained product is baked in the inactive atmosphere and then cooled down to a temperature close to a room temperature to be thereafter taken out. This product is powdered or cracked to obtain powder preferably in a range of 8 to 25 $\mu$m, more preferably in a range of 8 to 20 $\mu$m, or most preferably in a range of 10 to 15 $\mu$m. A conductive agent, a binding agent and/or a solvent etc. is added to make the product into slurry-like condition, and the slurry is applied/dried on a substrate of a collector made of a copper foil, a nickel mesh or a stainless mesh etc. to obtain an electrode (a negative electrode). The collector for making the particles bind can be used without limit and, for example, a metal column, a metal coil, a metal plate, a metal thin film, a carbon plate, a carbon column and so forth can be used. In particular, a metal thin film such as a nickel foil or a copper foil is preferable. The copper foil is more preferable. In addition, an electrode material in which particles as a negative electrode material accretes to the collector can be formed into an arbitrary shape by a method such as roll forming or compression forming.

As the conductive agent which can be used for the above purpose, there are high crystalline artificial graphite or natural graphite having the electric conductivity of not less than 1 S/cm, a high purity refined product obtained from these materials, metal fine powder having the particle diameter of not more than 25 $\mu$m, preferably 15 $\mu$m, more preferably 10 $\mu$m or usually not less than 0.1 $\mu$m such as copper, nickel, stainless or iron, or a mixture of these materials.

As the binding agent, there are a resin-based polymer which is stable relative to the solvent such as polyethylene, polypropylene, polyethylene terephthalate, aromatic polyamide or cellulose etc.; a rubber type polymer such as styrene butadiene rubber, isoprene rubber, butadiene rubber or ethylene propylene rubber etc.; a thermoplastic elastomeric polymer such as a styrene ethylene butadiene styrene block copolymer and a hydrogen additive thereof, a styrene isoprene styrene block copolymer, a styrene isoprene styrene block copolymer and a hydrogen additive thereof etc.; a soft resinoid polymer such as syndiotactic 1,2-polybutadiene, ethylene-vinyl acetate copolymer or a propylene $\alpha$-olefin (carbon number: 2 to 12) copolymer etc.; a fluorine-based polymer such as poly(vinylidene fluoride), polytetrafluoroethylene, or a polytetrafluoro-ethylene ethylene copolymer etc.; polymer composition having the ion conductivity of alkali metal ion, in particular lithium ion; or mixtures of the above binding agents.

As the above-described polymer having the ion conductivity, it is possible to use: a system obtained by combining alkali metallic salt mainly containing lithium or lithium salt with a polyether type high molecular compound such as polyethylene oxide or polypropylene oxide etc.; a cross-linked polymer of a polyether compound; or a high molecular compound such as polyepichlorohydrin, polyphosphazene, polysiloxane, poly(vinyl pyrrolidone), poly(vinyliden carbonate) or polyacrylonitrile etc.; or a system obtaining by blending an organic compound having the high dielectric constant or the ion-dipole interaction force such as propylene carbonate, ethylene carbonate or $\gamma$-butyrolactone with the above system.

As the solvent, it is possible to use: water; acetone; dimethyl ether; alcohol such as methanol, ethanol, butanol or isopropanol etc.; N-methyl pyrrolidinone; dimethylformamide; dimethylacetamide; hexamethylphosphoramide; dimethylsulfoxide; benzene; toluene; xylene; quinoline; pyridine; methylnaphthalene; hexane and so forth.

As a form for mixing the negative electrode material particles used in the present invention with the binding agent, various kinds of conformations can be taken. That is, there are a conformation in which two kinds of particles are mixed and bound with each other, that in which the fiber type binding agent is mixed with the particles according to the present invention and the conductive agent in the interlacing manner, that in which a layer of the binding agent accretes on the surface of particles and so forth.

As to the mixing proportion of the negative electrode material particles and the conductive agent, assuming that the entire constitutive substance of the negative electrode is 100 wt %, it is preferable that the negative electrode material is at least 60 wt % and the conductive agent is not less than 1 wt % and not more than 30 wt %. If the conductive agent whose amount exceeds the above value is added, the charge and discharge capacity that the electrode can generate per a unit volume is reduced. Further, if the amount of the conductive agent is less than the above-described value, a conductive path of the conductive agents cannot be formed in the electrode and the addition effect cannot be hence fully exhibited.

The mixing proportion of the binding agent relative to the negative electrode particles and the conductive agent is preferably 0.1 to 30 wt %, more preferably 0.5 to 5 wt %, with respect to a total weight of the negative electrode particles and the conductive agent. If the binding agent whose amount exceeds the above value is added, the internal resistance of the electrode increases, which is not preferable. Further, if the binding agent whose amount is less than the above value is added, the binding property of the collector and the electrode powder is deteriorated.

Description will now be given as to the case where this negative electrode is used to manufacture a battery. The electrolytic solution and the positive electrode are combined with a separator, a gasket, a collector, a sealing plate, a cell case and so forth which are well known as battery constitutive elements in order to manufacture a non-aqueous lithium secondary battery. The producible battery is not restricted to a cylindrical battery, a square battery, a coin type batter and so forth in particular. Fundamentally, however, the collector and the negative electrode are mounted on a cell base plate, the electrolytic solution and the separator are mounted thereon, and then the positive electrode is further mounted thereon in such a manner that it is opposed to the negative electrode. This is caulked with the gasket and the sealing plate to obtain the secondary battery.

As a non-aqueous solvent which can be used for the electrolytic solution, it is possible to use: a system obtaining by combining lithium salt or alkali metallic salt mainly containing lithium with an organic solvent such as propylene carbonate, ethylene carbonate, diethyl carbonate, dimethyl carbonate, ethyl methyl carbonate, 1,2-dimethoxyethane, γ-butyrolactone, tetrahydrofuran, 2-methyltetrahydrofuran, sulfolane, 1,3-dioxolane, dimethyl sulfide, propylene sulfide, ethylene sulfide, or vinylene carbonate etc.; or a polymer compound such as polyepichlorohydrin, polyphosphazene, polysiloxane, polyvinyl pyrrolidone), poly(vinylidene carbonate) or polyacrylonitrile; or a system obtained by mixing one or more kinds of organic compound having the high dielectric constant or the ion-dipole interaction force such as propylene carbonate or ethylene carbonate, γ-butyrolactone in the former system.

Into this solvent is mixed the electrolyte such as $LiClO_4$, $LiPF_6$, $LiBF_4$, $LiCF_3SO_3$, $LiAsF_6$, LiCl, LiBr, Li trifluorosulfonimide, Li bis (tetrafluoromethanesulfonyl) imide of approximately 0.5 to 2.0 M to obtain the electrolytic solution.

Further, it is possible to use a gel electrolyte obtained by mixing into the above organic solvent and the above electrolyte the polyether-based polymer compound such as polyethyleneoxide, polypropyleneoxide, or poly(methacryloylethyleneoxide) etc. which is a conductive body of alkali metal cation such as lithium ion etc.; a cross-linked polymer of a polyether compound; or ω-alkylated polyether such as polyethyleneoxide dimethyl ether in which the hydrogen group at the constitutional end of these substances is converted into alkyl group such as methyl group or ethyl group etc.; polyacrylonitrile; or poly(vinyl alcohol) having the high degree of saponification.

As the positive electrode material, any conventionally known material can be used and not be restricted to a certain type. Specifically, it is possible to use $LiFeO_2$, $LiCoO_2$, $LiNiO_2$, $LiMn_2O_4$, and a non-proportional compound of these substances, $MnO_2$, $TiS_2$, $FeS_2$, $Nb_3S_4$, $Mo_3S_4$, $CoS_2$, $V_2O_5$, $P_2O_5$, $CrO_3$, $V_6O_{13}$, $TeO_2$, $GeO_2$ and so forth.

The positive electrode can be obtained by the following method. The conductive agent such as acetylene black or graphite etc. is added to the positive electrode material and tetrafluoroethylene or the like as the binding agent is mixed thereto. Thereafter, the obtained product is applied on the aluminum foil and then the obtained product is formed and dried.

(Embodiments)

The present invention will now be described further in detail based on embodiments. The present invention is, however, not restricted by these examples.

Method for Evaluating Electrode Material

All the evaluations were carried out in the following manner. The negative electrode material according to the present invention and the binding agent were used and applied on the copper foil collector to be bound. They were then formed in a pellet form. This was obtained as a half cell having the counter electrode formed of lithium metal together with a separator and an electrolytic solution and assembled in a 2016 coin cell. The charge and discharge capacity was evaluated by using a charge and discharge testing device in a cell such as described above. However, the similar effect can be expected by using a lithium ion battery assembled together with a positive electrode.

EXAMPLE 1

40 g of a metal material which includes Si on the surface of or inside $NiSi_2$ and has the average particle diameter of 12.5 μm and 2 g of artificial graphite which has $d_{002}$ of 0.336 nm, an R value obtained from a Raman spectrum being 0.2 and the average particle diameter of 1.6 μm were homogeneously mixed in the atmosphere by a molder grinder manufactured by MRK for two minutes. 5 g of tar pitch which has H/C of approximately 1.0 and the aromaticity index fa of approximately 0.5 is added and further mixed into this mixture. The obtained product was heated up to 900° C. at a temperature raising rate of 8° C./min in the argon atmosphere in a baking furnace and maintained for one hour. After cooling down the baked product to nearly a room temperature, it was cracked with an agate mortar and classified by using a sieve having a sieve opening of 45 μm. It was further sized in such a manner that the average particle diameter became 14.1 μm to provide a sample.

With respect to the proportion of the metal material M, the graphite material and the carbonaceous material of the particles obtained from the yield during baking and the element analysis, assuming that the entire particle is 100 wt %, they were respectively 94 wt %, 5 wt % and 1 wt %. Further, when the sample particle was observed with SEM, the structure in which a mixture of the graphite and the carbonaceous material covers the surface of the metal material M particles was confirmed. A value of the specific surface area obtained from the BET method using the nitrogen gas of the particle was 1 $m^2$/g; a tap density in the case that tapping was carried out 100 times was 2.1 g/cc; a value R obtained from the Raman spectrum was 0.4; and the electric conductivity with a void ratio of 75% was $8\times10^{-4}$ S/cm.

1 g of the artificial graphite which has $d_{002}$ of 0.336 nm and the average particle diameter of 1.6 μm as the conductive agent was added together with a total of 2.46 wt % of carboxymethyl cellulose (CMC) and styrene butadiene rubber (SBR) as the binding agent to 6 g of the sample particle which corresponds to 100 wt % and then the mixture was mixed. The obtained product was coated to the copper foil having the thickness of 19 μm and then subjected to preliminary drying at the temperature of 80° C. Moreover, it was punched out into a discoid shape having the diameter of 12.5 mm, and then heated and dried under the reduced pressure at 110° C. for a whole day and night, thereby obtaining the electrode.

A polyethylene separator impregnated with the electrolytic solution was interposed between the obtained electrode and the lithium metal electrode being opposed to the obtained electrode to produce a coin type cell, and the charge and discharge test was carried out. There was used the electrolytic solution obtained by dissolving 1.25 mol/L of lithium hexafluorophosphate (LiPF$_6$) into a solvent in which ethylene carbonate (EC) and ethyl methyl carbonate (EMC) are mixed with a volumetric ratio of 1:3.

As to a reference charge and discharge test, doping was carried out until a difference in potential between electrodes becomes OV with current density of 0.32 mA/cm$^2$ and de-doping was performed until such a difference becomes 1.5V with the same current density.

The capacity value was evaluated by respectively performing the charge and discharge test with respective to three coin type cells and using the average value of the de-doping capacity in the first charge and discharge cycle, the average value of the irreversible capacity obtained by subtracting the de-doping capacity from the doping capacity in the same cycle, and a percentage (capacity maintenance ratio/%) of a value obtained by dividing the 20th discharge capacity by the first discharge capacity (and so forth).

irreversible capacity(mAh/cc)=1*st* Doping capacity–1*st* De-doping capacity

Capacity Maintenance Ratio (%)=(20*th* De-doping Capacity/1*st* De-doping capacity)×100.

It is to be noted that the true specific gravity of the sample before lithium doping was used for the specific gravity of the negative electrode material (and so forth).

EXAMPLE 2

40 g of the metal material M, 3 g of the artificial graphite and 7 g of the tar pitch in the Example 1 were used, and mixing and baking were carried out by the method similar to that in the Example 1. After the baked product was cooled down to nearly a room temperature, it was cracked by an agate mortar and classified by using a sieve having a sieve opening of 45 μm. It was further sized in such a manner that the average particle diameter became 14.1 μm to provide a sample.

With respect to the proportion of the metal material M, the graphite material and the carbonaceous material of the particles obtained from the yield during baking and the element analysis, assuming that the entire particle is 100 wt %, they were respectively 91 wt %, 7 wt % and 2 wt %. Further, when the sample particle was observed with SEM, the structure in which a mixture of the graphite and the carbonaceous material covers the surface of the metal material M was confirmed. A value of the specific surface area obtained from the BET method using the nitrogen gas of the particle was 1 m$^2$/g; a tap density in the case that tapping was carried out 100 times was 1.9 g/cc; a value R obtained from the Raman spectrum was 0.4; and the electric conductivity with a void ratio of 75% was 9×10$^{-3}$ S/cm.

0.9 g of the artificial graphite which has d$_{002}$ of 0.336 nm and the average particle diameter of 3.7 μm as the conductive agent was added together with a total of 2.46 wt % of carboxymethyl cellulose (CMC) and styrene butadiene rubber (SBR) as the binding agent to 6 g of the sample particle which corresponds to 100 wt % and the mixture was mixed. The electrode was manufactured and the charge and discharge test was carried out similarly as in the Example 1.

EXAMPLE 3

40 g of the metal material M, 4 g of the artificial graphite and 15 g of the tar pitch in the Example 1 were used, and mixing and baking were carried out by the method similar to that in the Example 1. After the baked product was cooled down to nearly a room temperature, it was cracked by a hammer mill and classified by using a sieve having a sieve opening of 38 μm. It was further sized in such a manner that the average particle diameter became 14.1 μm to provide a sample.

With respect to the proportion of the metal material M, the graphite material and the carbonaceous material of the particles obtained from the yield during baking and the element analysis, assuming that the entire particle is 100 wt %, they were respectively 87 wt %, 9 wt % and 4 wt %. Further, when the sample particle was observed with SEM, the structure in which a mixture of the graphite and the carbonaceous material covers the surface of the metal material M was confirmed. A value of the specific surface area obtained from the BET method using the nitrogen gas of the particle was 2 m$^2$/g; a tap density in the case that tapping was carried out 100 times was 1.7 g/cc; a value R obtained from the Raman spectrum was 0.4; and the electric conductivity with a void ratio of 75% was 5×10$^{-3}$ S/cm.

0.6 g of the artificial graphite which has d$_{002}$ of 0.336 nm and the average particle diameter of 3.7 μm as the conductive agent was added together with a total of 2.46 wt % of carboxymethyl cellulose (CMC) and styrene butadiene rubber (SBR) as the binding agent to 6 g of the sample particle which corresponds to 100 wt %. The electrode was manufactured and the charge and discharge test was carried out similarly as in the Example 1.

EXAMPLE 4

12 g of the artificial graphite which has d$_{002}$ of 0.336 nm, a value R of a Raman spectrum being 0.1 and the average particle diameter of 0.6 μm was added to 150 g of the metal material used in the Example 1 and treated by using a mechano fusion manufactured by Hosokawa Micron Corporation at an ordinary temperature in the nitrogen atmosphere for actual 15 minutes. 18 g of the tar pitch used in the Example 1 was added to 100 g of this mixture and they were further mixed in the atmosphere. This was baked by the similar method as the Example 1 and crashed by a hammer mill. It was further classified by a sieve having a sieve opening of 38 μm and sized in such a manner that the average particle diameter became 14.1 μm to provide a sample.

With respect to the proportion of the metal material M, the graphite material and the carbonaceous material of the particles obtained from the yield during baking and the element analysis, assuming that the entire particle is 100 wt %, they were respectively 90 wt %, 8 wt % and 2 wt %. Further, when the sample particle was observed with SEM, the structure in which a mixture of the graphite and the carbonaceous material covers the surface of the metal material M was confirmed. A value of the specific surface area obtained from the BET method using the nitrogen gas of the particle was 3 m$^2$/g; a tap density in the case that tapping was carried out 100 times was 2.2 g/cc; a value R obtained from the Raman spectrum was 0.2; and the electric conductivity with a void ratio 75% was 3×10$^{-3}$ S/cm.

0.8 g of the artificial graphite which has d$_{002}$ of 0.336 nm and the average particle diameter of 3.7 μm as the conductive agent was added together with a total of 2.46 wt % of carboxymethyl cellulose (CMC) and styrene butadiene rubber (SBR) as the binding agent to 6 g of the sample particle which corresponds to 100 wt %. The electrode was manufactured and the charge and discharge test was carried out similarly as in the Example 1.

EXAMPLE 5

80 g of the metal material used in the embodiment 1 and 5 g of the artificial graphite which has d$_{002}$ of 0.336 nm, a value R of a Raman spectrum being 0.2 and the average particle diameter of 1.6 μm were treated by using a hybridizer manufactured by Nara Machinery Co., Ltd. at an ordinary temperature in the nitrogen atmosphere for three minutes. 8 g of the tar pitch used in the Example 1 was added to 40 g of this mixture and they were further mixed in the atmosphere. This was baked by the similar method as the Example 1 and crashed by an agate mortar. It was further classified by a sieve having a sieve opening of 45 μm and sized in such a manner that the average particle diameter became 14.1 μm to provide a sample.

With respect to the proportion of the metal material M, the graphite material and the carbonaceous material of the particles obtained from the yield during baking and the element analysis, assuming that the entire particle is 100 wt %, they were-respectively 92 wt %, 6 wt % and 2 wt %. Further, when the sample particle was observed with SEM, the structure in which a mixture of the graphite and the carbonaceous material covers the surface of the metal material M was confirmed. A value of the specific surface area obtained from the BET method using the nitrogen gas of the particle was 2 m$^2$/g; a tap density in the case that tapping was carried out 100 times was 2.2 g/cc; a value R obtained from the Raman spectrum was 0.9; and the electric conductivity with a void ratio of 75% was 2×10$^{-3}$ S/cm.

0.9 g of the artificial graphite which has $d_{002}$ of 0.336 nm and the average particle diameter of 1.6 μm as the conductive agent was added together with a total of 2.46 wt % of carboxymethyl cellulose (CMC) and styrene butadiene rubber (SBR) as the binding agent to 6 g of the sample particle which corresponds to 100 wt %. The electrode was manufactured and the charge and discharge test was carried out similarly as in the Example 1.

Comparative Example 1

The artificial graphite which has $d_{002}$ of 0.336 nm, a value R of a Raman spectrum being 0.1, a value of the specific surface area obtained by the BET method using the nitrogen gas being 21 m$^2$/g, a tap density in the case that tapping was carried out 100 times being 0.2 g/cc, the electric conductivity at the void ratio of 75% being 5 S/cm, and the average particle diameter of 3.7 μm was mixed with a total of 2.46 wt % of carboxymethyl cellulose (CMC) and styrene butadiene rubber (SBR) which are the binding agent. The electrode was manufactured and the charge and discharge test was carried out similarly as in the Example 1.

Comparative Example 2

The metal material M used in the Example 1 which has a value of the specific surface area being 0.3 m$^2$/g, a tap density in the case that tapping was carried out 100 times being 2.3 g/cc, and the electric conductivity at the void ratio of 75% being 6×10$^{-7}$ S/cm was mixed with a total of 2.46 wt % of carboxymethyl cellulose (CMC) and styrene butadiene rubber (SBR) which are the binding agent. The electrode was manufactured and the charge and discharge test was carried out similarly as in the Example 1.

Comparative Example 3

1.2 g of the artificial graphite used in the Comparative Example 1 was added in and homogeneously mixed with 4.8 g of the metal material M used in the Example 1.

A value of the specific surface area obtained by the BET method using the nitrogen gas of the mixture was 4 m$^2$/g; a tap density in the case that tapping was carried out 100 times was 0.8 g/cc; a value R obtained from a Raman spectrum was 0.1; and the electric conductivity at the void ratio of 75% was not less than 1×10$^{-7}$ S/cm. A total of 2.46 wt % of carboxymethyl cellulose (CMC) and styrene butadiene rubber (SBR) which are the binding agent is mixed with the above mixture which corresponds to 100 wt %. The electrode was manufactured and the charge and discharge test was carried out similarly as in the Example 1.

The following is the comparative study between the Examples 1 to 5 and the Comparative Examples 1 to 3 in which the lithium secondary battery manufactured according to the present invention was concretely charged and discharged. Table 1 shows the de-doping capacity, the irreversible capacity and the capacity maintenance ratio of the lithium secondary battery obtained from the Examples 1 to 5 and the Comparative Examples 1 to 3.

EXAMPLE 6

40 g of a metal material which includes Si on the surface of or inside NiSi$_2$ and has the average particle diameter of 12.5 μm and 4 g of artificial graphite which has $d_{002}$ of 0.336 nm, the R value obtained from a Raman spectrum being 0.2 and the average particle diameter of 1.6 μm are homogeneously mixed in the atmosphere by a molder grinder manufactured by MRK for two minutes. 5 g of tar pitch which has H/C of approximately 1.0 and the aromaticity index fa of approximately 0.5 was added and further mixed this mixture. The obtained product was heated up to 900° C. at a temperature raising rate of 8° C./min in the argon atmosphere in a baking furnace and maintained for one hour. After cooling down the baked product to nearly a room temperature, it was cracked by an agate mortar and classified by using a sieve having a sieve opening of 45 μm. It was further sized in such a manner that the average particle diameter became 14.1 μm to provide a sample.

With respect to the proportion of the metal material M, the graphite material and the carbonaceous material of the particles obtained from the yield during baking and the element analysis, assuming that the entire particle is 100 wt %, they were respectively 90 wt %, 9 wt % and 1 wt %. Further, when the sample particle was observed with SEM, the structure in which a mixture of the graphite and the carbonaceous material covers the surface of the metal material M was confirmed.

0.7 g of the artificial graphite which has $d_{002}$ of 0.336 nm and the average particle diameter of 1.6 μm as the conductive agent was added together with a total of 2.46 wt % of carboxymethyl cellulose (CMC) and styrene butadiene rubber (SBR) as the binding agent into 6 g of the sample particle which corresponds to 100 wt % and the mixture was mixed. The obtained product was coated on the copper foil having the thickness of 19 μm and then subjected to preliminary drying at the temperature of 80° C. Moreover, it was punched out into a discoid shape having the diameter of 12.5 mm, and then heated and dried under the reduced pressure at 110° C. for a whole day and night, thereby obtaining the electrode.

A polyethylene separator impregnated with the electrolytic solution was interposed between the obtained electrode and the lithium metal electrode which was opposed to the obtained electrode to produce a coin type cell opposed to, and the charge and discharge test was carried out similarly as in the Example 1. There was used the electrolytic solution obtained by dissolving 1.25 mol/L of lithium hexafluorophosphate (LiPF$_6$) into a solvent in which ethylene carbonate (EC) and ethyl methyl carbonate (EMC) are mixed with a volumetric ratio of 1:3.

EXAMPLE 7

40 g of the metal material M, 4 g of the artificial graphite and 10 g of the tar pitch in the Example 6 were used, and mixing and baking were carried out by the method similar to that in the Example 1. After the baked product was cooled down to nearly a room temperature, it was cracked by an agate mortar and classified by using a sieve having a sieve opening of 45 μm. It was further sized in such a manner that the average particle diameter became 14.1 μm to provide a sample.

With respect to the proportion of the metal material M, the graphite material and the carbonaceous material of the particles obtained from the yield during baking and the element analysis, assuming that the entire particle is 100 wt %, they were respectively 89 wt %, 9 wt % and 2 wt %. Further, when the sample particle was observed with SEM, the structure in which a mixture of the graphite and the carbonaceous material covers the surface of the metal material M was confirmed.

0.7 g of the artificial graphite which has $d_{002}$ of 0.336 nm and the average particle diameter of 3.7 μm as the conductive agent was mixed together with a total of 2.46 wt % of carboxymethyl cellulose (CMC) and styrene butadiene rubber (SBR) as the binding agent into 6 g of the sample particle which corresponds to 100 wt %. The electrode was manufactured and the charge and discharge test was carried out similarly as in the Example 6.

EXAMPLE 8

150 g of a metal material which includes Si on the surface of or inside $NiSi_2$ and has the average particle diameter of 12.5 μm and 28 g of artificial graphite which has $d_{002}$ of 0.336 nm, the R value obtained from a Raman spectrum being 0.2 and the average particle diameter of 1.6 μm were treated in the nitrogen atmosphere by a mechano fusion manufactured by Hosokawa Micron Corporation for 15 minutes. 8 g of tar pitch used in the Example 6 was added to 40 g of the sample and further mixed in the atmosphere. The obtained product is baked in the similar method as in the Example 1 and cracked by a hammer mill. It was then classified by using a sieve having a sieve opening of 38 μm. It is further sized in such a manner that the average particle diameter became 14.1 μm to provide a sample.

With respect to the proportion of the metal material M, the graphite material and the carbonaceous material of the particles obtained from the yield during baking and the element analysis, assuming that the entire particle is 100 wt %, they were respectively 83 wt %, 16 wt % and 1 wt %. Further, when the sample particle was observed by an SEM, the structure in which a mixture of the graphite and the carbonaceous material covers the surface of the metal material M particles was confirmed.

0.2 g of the artificial graphite which has $d_{002}$ of 0.336 nm and the average particle diameter of 3.7 μm as the conductive agent was mixed together with a total of 2.46 wt % of carboxymethyl cellulose (CMC) and styrene butadiene rubber (SBR) as the binding agent into 6 g of the sample particle which corresponds to 100 wt %. The electrode was manufactured and the charge and discharge test was carried out similarly as in the Example 1.

EXAMPLE 9

80 g of a metal material which includes Si on the surface of or inside $NiSi_2$ and has the average particle diameter of 12.5 μm and 1 g of artificial graphite which has $d_{002}$ of 0.336 nm, the R value obtained from a Raman spectrum being 0.2 and the average particle diameter of 1.6 μm were treated at an ordinary temperature in the argon atmosphere by a hybridizer manufactured by Nara Machinery Co., Ltd. for three minutes. 7 g of tar pitch used in the Example 6 was added to 40 g of the sample and further mixed in the atmosphere. The obtained product was baked in the similar method as in the Example 1 and cracked by an agate mortar. It was then classified by using a sieve having a sieve opening of 45 μm. It was further sized in such a manner that the average particle diameter became 14.1 μm to provide a sample.

With respect to the proportion of the metal material M, the graphite material and the carbonaceous material of the particles obtained from the yield during baking and the element analysis, assuming that the entire particle is 100 wt %, they were respectively 97 wt %, 1 wt % and 2 wt %. Further, when the sample particle was observed with SEM, the structure in which a mixture of the graphite and the carbonaceous material covers the surface of the metal material M particles was confirmed.

1.3 g of the artificial graphite which has $d_{002}$ of 0.336 nm and the average particle diameter of 1.6 μm as the conductive agent was mixed together with a total of 2.46 wt % of carboxymethyl cellulose (CMC) and styrene butadiene rubber (SBR) as the binding agent into 6 g of the sample particle which corresponds to 100 wt %. The electrode was manufactured and the charge and discharge test was carried out similarly as in the Example 1.

The following is the comparative study between the Examples 6 to 9 and the Comparative Examples 1 to 3 in which the lithium secondary battery manufactured according to the present invention was concretely charged and discharged. Table 2 shows the de-doping capacity, the irreversible capacity and the capacity maintenance ratio of the lithium secondary battery obtained from the Examples 6 to 9 and the Comparative Examples 1 to 3.

TABLE 1

| Example No. | Discharge Capacity (mAh/cc) | Irreversible Capacity (mAh/cc) | Cycle Characteristic Maintenace Ratio (%) |
|---|---|---|---|
| Example 1 | 1261 | 150 | 77 |
| Example 2 | 1206 | 138 | 79 |
| Example 3 | 1223 | 166 | 83 |
| Example 4 | 1213 | 170 | 82 |
| Example 5 | 1134 | 170 | 75 |
| Compar. Ex. 1 | 770 | 110 | 98 |
| Compar. Ex. 2 | No operation | — | — |
| Compar. Ex. 3 | 1251 | 143 | 60 |

Note
Compar. Ex. means Comparative Example.

TABLE 2

| Example No. | Discharge Capacity (mAh/cc) | Irreversible Capacity (mAh/cc) | Cycle Characterstic Maintenace Ratio |
|---|---|---|---|
| Example 6 | 1226 | 162 | 69 |
| Example 7 | 1205 | 130 | 81 |
| Example 8 | 1186 | 249 | 88 |
| Example 9 | 1072 | 166 | 76 |
| Compar. Ex. 1 | 770 | 110 | 98 |

TABLE 2-continued

| Example No. | Discharge Capacity (mAh/cc) | Irreversible Capacity (mAh/cc) | Cycle Characterstic Maintenace Ratio |
|---|---|---|---|
| Compar. Ex. 2 | No operation | — | — |
| Compar. Ex. 3 | 1251 | 143 | 60 |

Note
Compar. Ex. means Comparative Example.

By using the negative electrode material according to the present invention, it is possible to provide a lithium secondary battery which has the high capacity, the small capacity degradation in a long-term cycle, and the small irreversible capacity generated in the initial charge.

What is claimed is:

1. A negative electrode material for a non-aqueous lithium secondary battery comprising a metal material M consisting of solid phases A and B, a graphite material, and a carbonaceous material having a crystallinity lower than that of said graphite material, wherein said metal material M has a structure in which a part or all of the surface of a core particle consisting of said solid phase A is covered with said solid phase B; said solid phase A contains at least silicon as a constituent element; and said solid phase B is a solid solution or intermetallic compound of (a) silicon and (b) at least one element selected from the group consisting of elements in the group 2, transition metal elements, elements in the group 12, elements in the group 13 and elements excepting carbon and silicon in the group 14 of the periodic table.

2. The negative electrode material according to claim 1, wherein a part or all of the surface of said metal material M is previously covered with said graphite material and said carbonaceous material having the crystallinity lower than that of said graphite material.

3. The negative electrode material according to claim 1, wherein a tap density in the case that tapping is carried out 100 times is not less than 1.3 g/cm$^3$.

4. The negative electrode material according to claim 1, wherein the proportion of said metal material M, said graphite material and said carbonaceous material are 50 to 95 wt %, 4.9 to 30 wt % and 0.1 to 20 wt %, respectively.

5. The negative electrode material according to claim 1, wherein, on the basis of Raman spectrum analysis using an argon ion laser having a wavelength of 514.3 nm, a peak intensity ratio R (=IB/IA) is not less than 0.2 and not more than 1, wherein IA is a peak intensity observed in a range of 1580 cm$^{-1}$ to 1620 cm$^{-1}$, and IB is a peak intensity observed in a range of 1350 cm$^{-1}$ to 1370 cm$^{-1}$.

6. The negative electrode material according to claim 1, wherein a BET specific surface area measured by using nitrogen gas is 0.1 to 20 m$^2$/g.

7. The negative electrode material according to claim 1, wherein when a void ratio is 75%, an electric conductivity is not less that 1×10$^{-5}$ S/cm.

8. The negative electrode material according to claim 2, wherein the covering proportion of said graphite material or said carbonaceous material which covers the surface of said metal material M observed with SEM is 30 to 100% of the entire surface of said metal material M.

9. A non-aqueous lithium secondary battery comprising at least a positive electrode, a negative electrode and an electrolytic solution obtained by dissolving an electrolyte in a non-aqueous solvent, wherein said negative electrode material according to claim 1 is included in said negative electrode.

10. The lithium secondary battery according to claim 9, wherein, assuming that the entire material of said negative electrode is 100 wt %, said negative electrode includes at least not less than 60 wt % of said negative electrode material and not less than 1 wt % and not more than 30 wt % of said graphite material as a conductive agent.

11. A method for manufacturing a negative electrode material for a non-aqueous lithium secondary battery, wherein a metal material M, a graphite material and a precursor of a carbonaceous material which is an organic material are mixed and baked in an inactive atmosphere; said metal material M consists of solid phases A and B, and has a structure in which a part or all of the surface of a core particle consisting of said solid phase A is covered with said solid phase B; said solid phase A includes at least silicon as a constituent element; said solid phase B is a solid solution or intermetallic compound of (a) silicon and (b) at least one element selected from the group consisting of elements in the group 2, transition metal elements, elements in the group 12, elements in the group 13 and elements except carbon and silicon in the group 14 of the periodic table.

12. The method according to claim 11, wherein the surface of said metal material M is previously covered with said graphite material and said precursor of said carbonaceous material as an organic material, followed by baking the covered metal material M.

13. The method according to claim 11, wherein the surface of said metal material M is covered with said graphite material by subjecting said metal material and said graphite material to a mechanical treatment in an inactive atmosphere, and the thus treated material is further subjected to a contact treatment with said precursor of said carbonaceous material and then baked.

14. The method according to claim 13, wherein said mechanical treatment is carried out in an inactive atmosphere at a shear speed of not less than 10 S$^{-1}$.

15. The method according to claim 11, wherein a baking temperature is 700 to 1500° C.

16. The method according to claim 11, wherein a spacing of crystalline planes (002) of said graphite material is not more than 0.348 nm, and a thickness Lc of a lamination layer of said graphite material is not less than 10 nm.

17. The method for manufacturing a negative electrode material according to claim 11, wherein, on the basis of Raman spectrum analysis using an argon ion laser beam having a wavelength of 514.3 nm, said graphite material has a peak intensity ratio R (=IB/IA) of not more than 0.4, wherein IA is a peak intensity observed in a range of 1580 cm$^{-1}$ to 1620 cm$^{-1}$, and IB is a peak intensity observed in a range of 1350 cm$^{-1}$ to 1370 cm$^{-1}$.

18. The method according to claim 11, wherein an average particle diameter of said graphite material is not less than 1 μm and not more than 1 mm.

19. The method according to claim 11, wherein said precursor of said carbonaceous material is at least one carbonizable organic compound selected from the group consisting of coal tar pitch, coal-based heavy oil, heavy oil from direct distillation, petroleum-based heavy oil, an aromatic hydrocarbon, an azacyclic organic compound, a thiacyclic organic compound, a nitrogen-contained organic polymer, a sulfur-contained organic polymer and a natural polymer.

20. The method according to claim 11, wherein said precursor of said carbonaceous material has a hydrogen-to-carbon ratio of not less than 0.4 and not more than 1.8.

* * * * *